US 6,689,997 B2
United States Patent
Lee

(10) Patent No.: US 6,689,997 B2
(45) Date of Patent: Feb. 10, 2004

(54) MICROWAVE OVEN WITH SAUCER HOLDERS

(75) Inventor: Jeong-Hee Lee, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/234,155

(22) Filed: Sep. 5, 2002

(65) Prior Publication Data
US 2003/0226843 A1 Dec. 11, 2003

(30) Foreign Application Priority Data
Jun. 8, 2002 (KR) .................................. 2002-32162

(51) Int. Cl.⁷ ................................................ H05B 6/80
(52) U.S. Cl. .................. 219/762; 219/739; 219/756; 219/732; 99/DIG. 14
(58) Field of Search ................... 219/762, 756, 219/725, 732, 739, 740, 763; 99/DIG. 14

(56) References Cited

U.S. PATENT DOCUMENTS 5,505,121 A * 4/1996 Spector ........................ 99/290
6,255,637 B1 * 7/2001 Collett ........................ 219/732

FOREIGN PATENT DOCUMENTS

| DE | 296 00 093 U1 | 4/1996 | |
| GB | 435320 | 9/1935 | |
| GB | 719549 | 12/1954 | |
| JP | 62-299618 | * 12/1987 | ............. 219/763 |
| JP | 1-134118 | * 5/1989 | ............. 219/756 |
| JP | 7-198151 | * 8/1995 | |
| JP | 10-7167 | * 1/1998 | |
| KR | 2002-7032 | 1/2002 | |
| KR | 2002-22954 | 3/2002 | |

* cited by examiner

Primary Examiner—Philip H. Leung
(74) Attorney, Agent, or Firm—Staas & Halsey LLP

(57) ABSTRACT

A microwave oven includes a saucer holder, and a saucer used with the microwave oven. The saucer holder is provided on the external surface of the microwave oven. The saucer removably engages with the saucer holder. Thus, the microwave oven allows a user to easily carry a heated cup after a cooking process.

21 Claims, 17 Drawing Sheets

MICROWAVE OVEN WITH SAUCER HOLDERS

CROSS-REFERENCE TO RELATED APPLICATIONS

This application claims the benefit of Korean Application No. 2002-32162, filed Jun. 8, 2002, in the Korean Industrial Property Office, the disclosure of which is incorporated herein by reference.

BACKGROUND OF THE INVENTION

1. Field of the Invention

The present invention relates generally to a microwave oven, which is provided on an external surface thereof with a saucer holder, and a saucer used with the microwave oven and removably engaged with the saucer holder.

2. Description of the Related Art

As well known to those skilled in the art, a microwave oven is an appliance used to cook food laid in a cooking cavity thereof. To cook the food, frictional heat is generated within the food as high-frequency electromagnetic waves cause molecules of moisture laden in the food to vibrate.

FIG. 1 is a perspective view of a conventional microwave oven. Referring to FIG. 1, the conventional microwave oven is provided at its front wall with a door 100. A control panel 104 is provided on the front wall at a position adjacent to the door 100. The door 100 is hinged to a body of the microwave oven, and allows a user to selectively open a cooking cavity 102. The control panel 104 occupies a smaller area in comparison with the door 100, and allows the user to input as well as confirm several cooking conditions, such as a cooking time and a cooked state of food.

A window 101 made of a transparent material is provided in the door 100 in such a way as to cover a larger part of the door 100. When cooking food using the above microwave oven, the user may view the cooking cavity 102 where food is cooked through the window 101 so the user may confirm the cooked state of the food. Recently, there has been effort to improve the microwave oven such that the window 101 blocks electromagnetic waves due to the harmful effects of such waves on human health. The control panel 104 is provided with control knobs 104b and 104c to allow the user to input various conditions, inducing a desired cooking time and a desired cooked state of food (for example, frozen food), to a microprocessor in the microwave oven. The control panel 104 also has a display 104a. The display 104a displays thereon several values inputted by the user such as the cooking time. That is, the display 104a allows the user to confirm whether or not the values inputted using the control knobs 104b and 104c are correct, and whether or not the cooking time has elapsed. The microwave oven is also provided with a handle 103 used to open or dose the door 100.

When it is desired to heat liquid food such as milk or water in the microwave oven, the liquid food must be contained in a cup. When finishing the cooking process, the liquid food is taken out from the cooking cavity 102 along with the cup. Typically, the cup as well as the liquid food contained in the cup are very hot. Thus, in order to carry the heated cup, a saucer is required. Therefore, the conventional microwave oven has a problem in that it is inconvenient and dangerous to carry a cup containing liquid food heated and cooked in the microwave oven.

SUMMARY OF THE INVENTION

Accordingly, it is an object of the present invention to provide a microwave oven including a saucer holder provided at a predetermined position on an external surface of the microwave oven, and a saucer removably engaging with the saucer holder, thus allowing a heated cup to be conveniently carried after a cooking process since the saucer is always provided on the microwave oven.

Additional objects and advantages of the invention will be set forth in part in the description which follows and, in part, will be obvious from the description, or may be learned by practice of the invention.

The foregoing and other objects of the present invention are achieved by providing a microwave oven including a saucer holder provided at a predetermined position of an external surface of the oven to removably hold a saucer on the holder.

The foregoing and other objects of the present invention are achieved by providing a saucer to hold various kinds of cups including a cup seating part having a disc shape, and an engaging part to removably engage with a saucer holder provided on a microwave oven.

The foregoing and other objects of the present invention are achieved by providing a microwave oven including a saucer holder provided at a predetermined position on an external surface of the microwave oven, and a saucer to removably engage with the saucer holder.

BRIEF DESCRIPTION OF THE DRAWINGS

The above and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
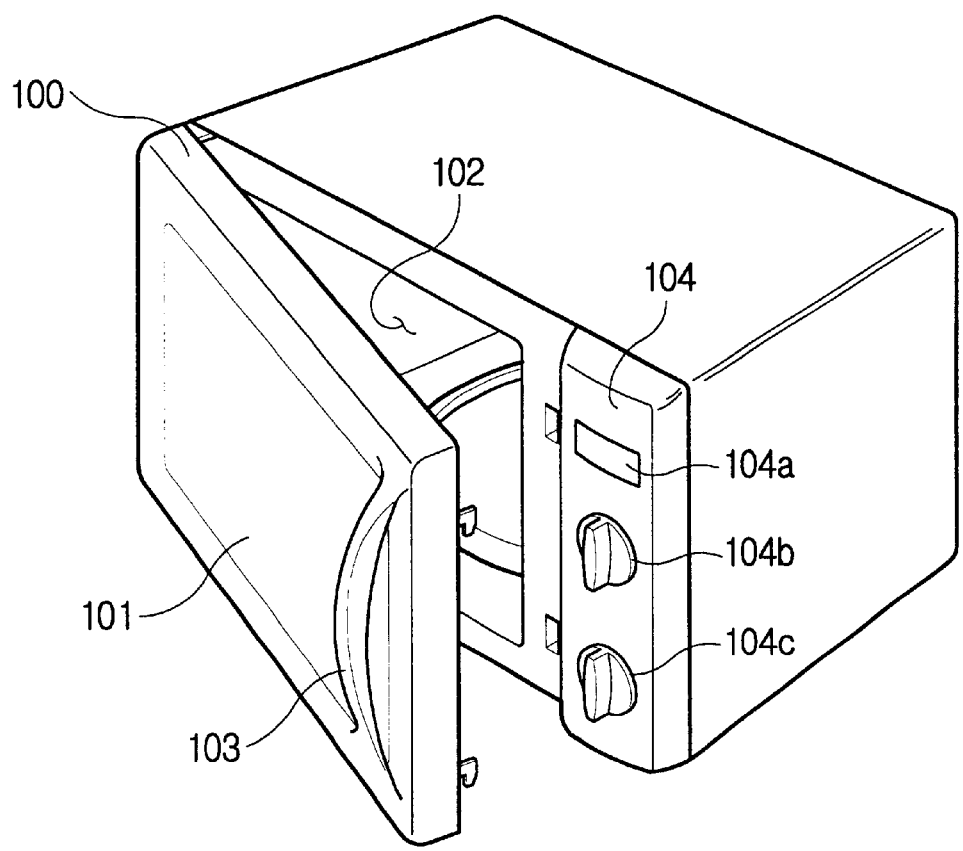
FIG. 1 is a perspective view showing a conventional microwave oven.

Reference will now be made in detail to the present preferred embodiments of the present invention, examples of which are illustrated in the accompanying drawings, wherein like reference numerals refer to like elements throughout.

Figure 2A:
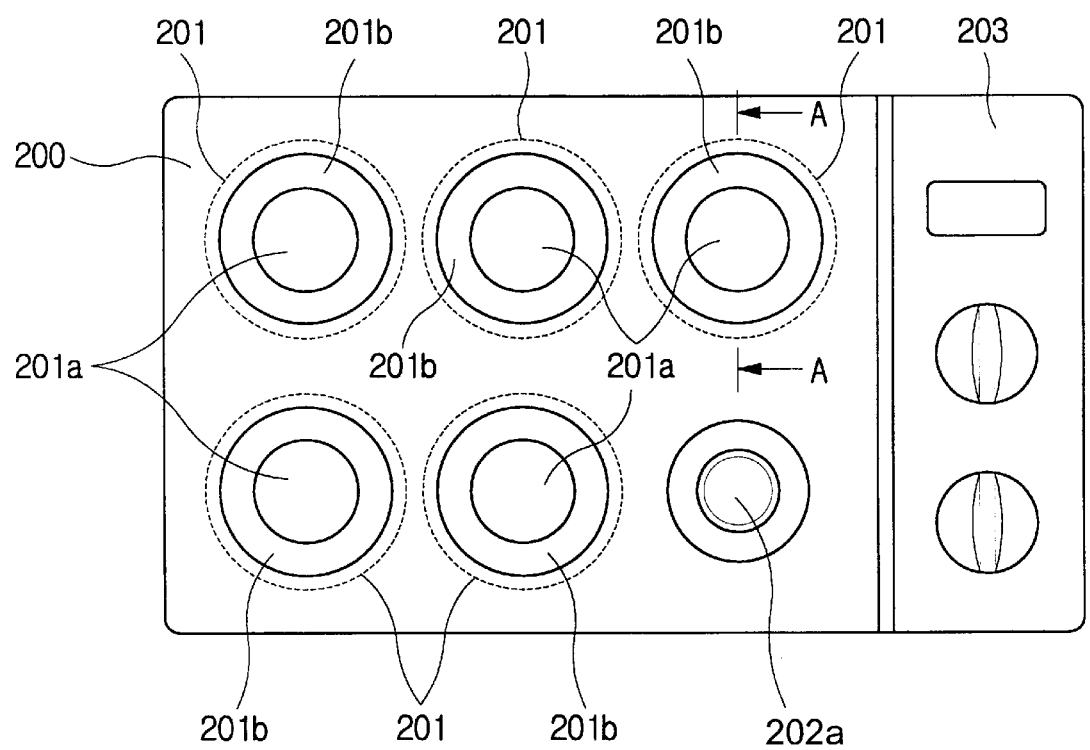
FIGS. 2A, 2B, and 2C are front views showing a microwave oven provided on an external surface of a door of the microwave oven with saucer holders according to embodiments of the present invention.
Figure 2B:
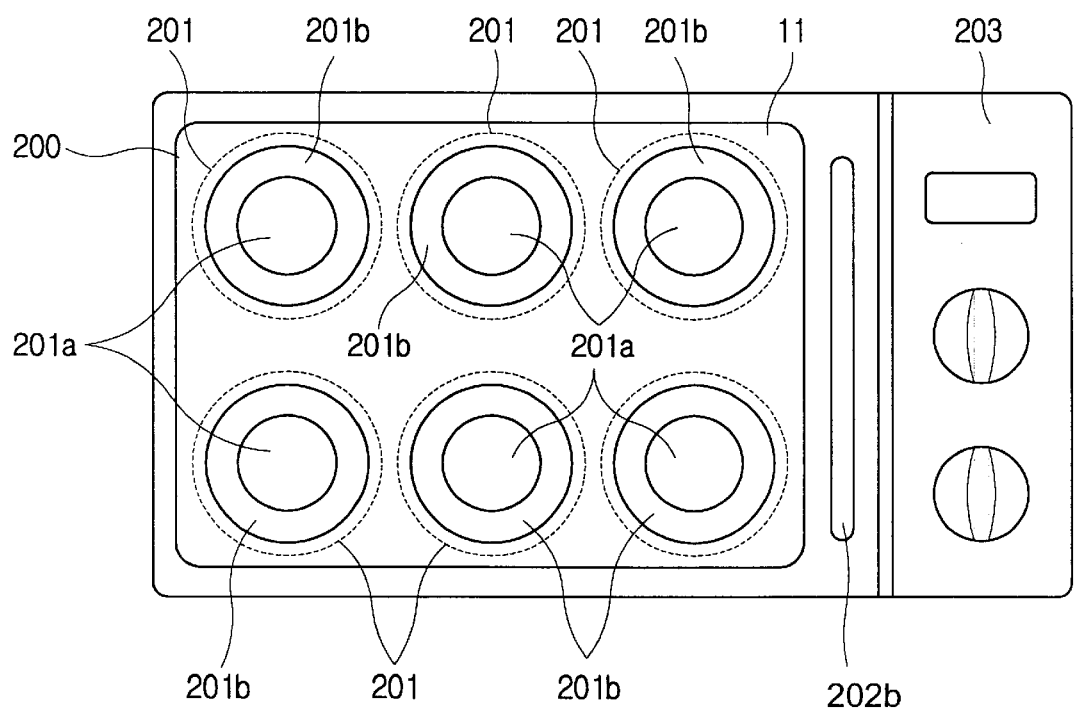
Figure 2C:
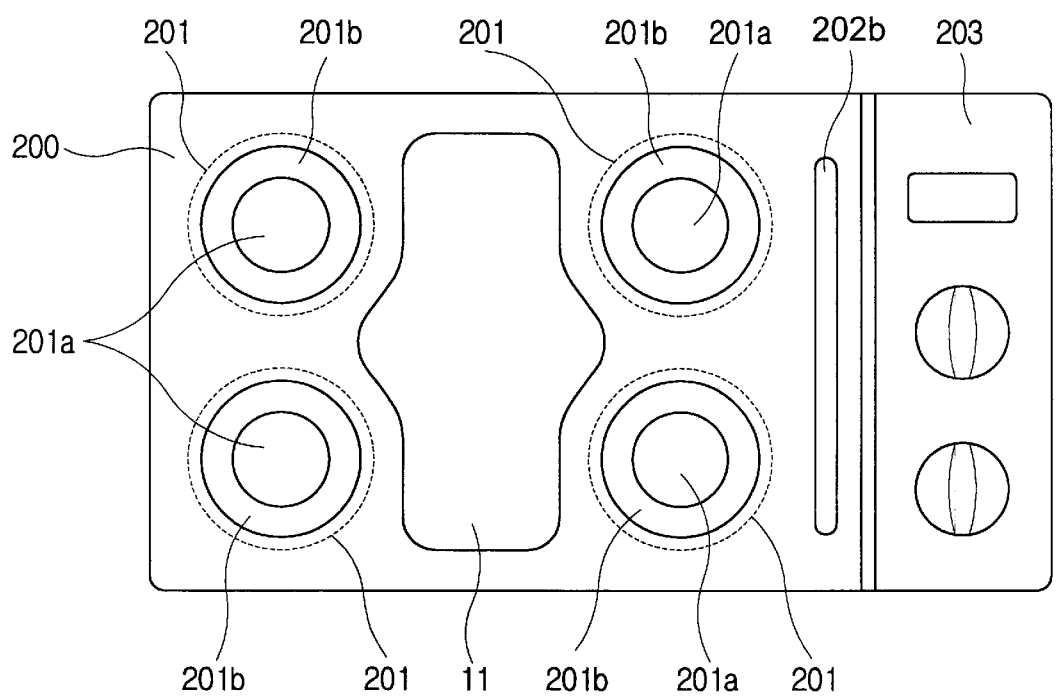
Figure 3:
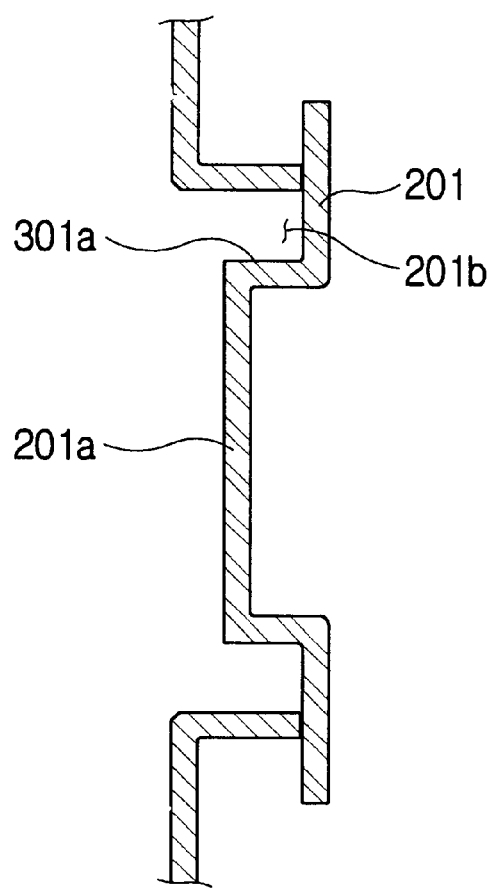
FIG. 3 is a sectional view taken along a line A—A of FIG. 2A.
Figure 4A:
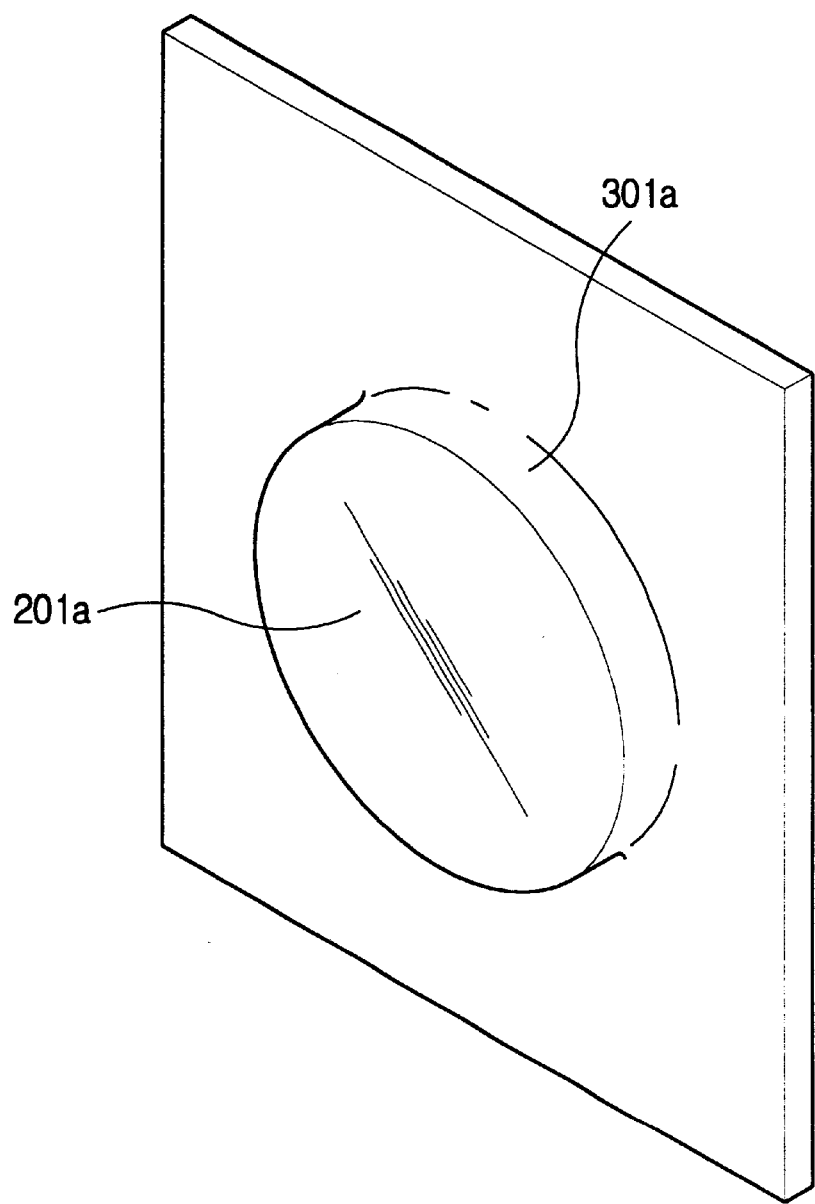
FIG. 4A is a perspective view showing a projecting part of a saucer holder provided on the external surface of the microwave oven according to the present invention]
Figure 4B:
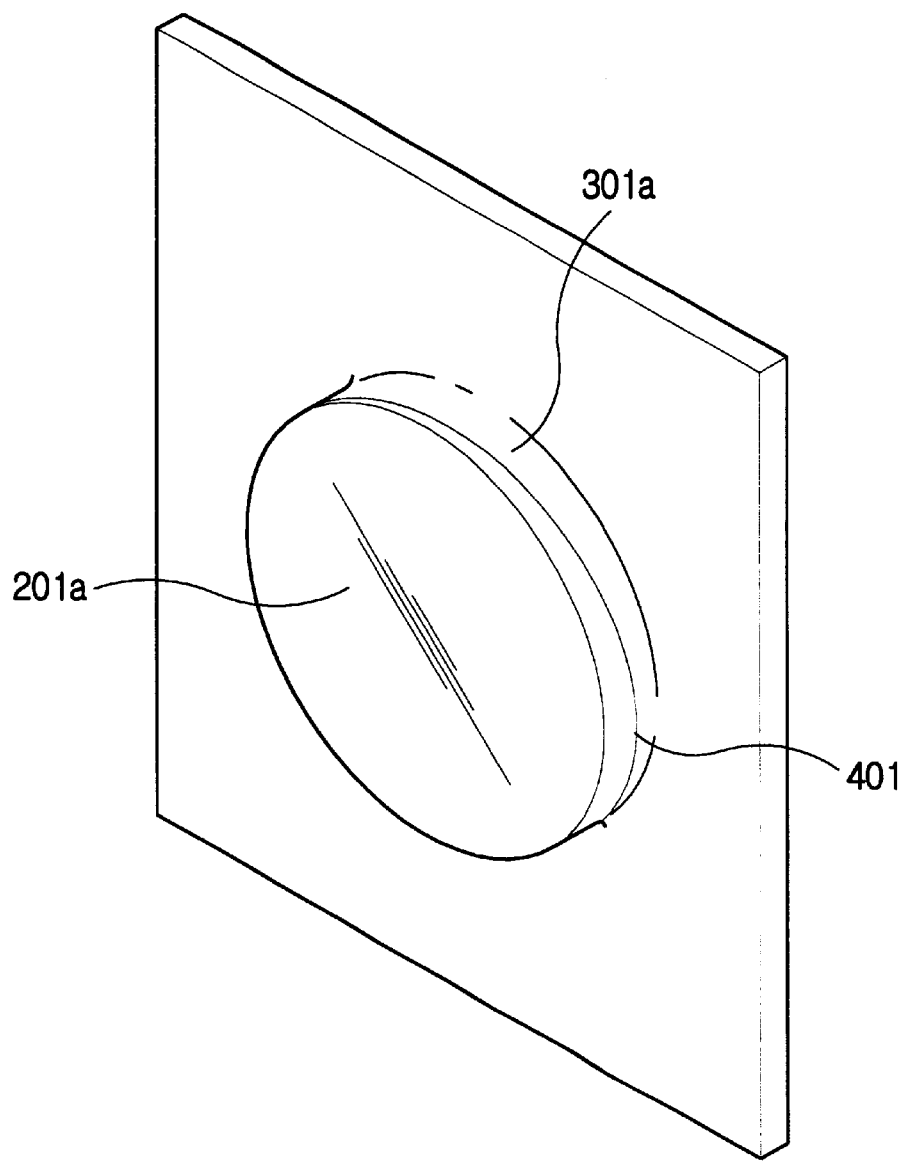
FIGS. 4B and 4C are perspective views showing projecting parts of saucer holders.
Figure 4C:
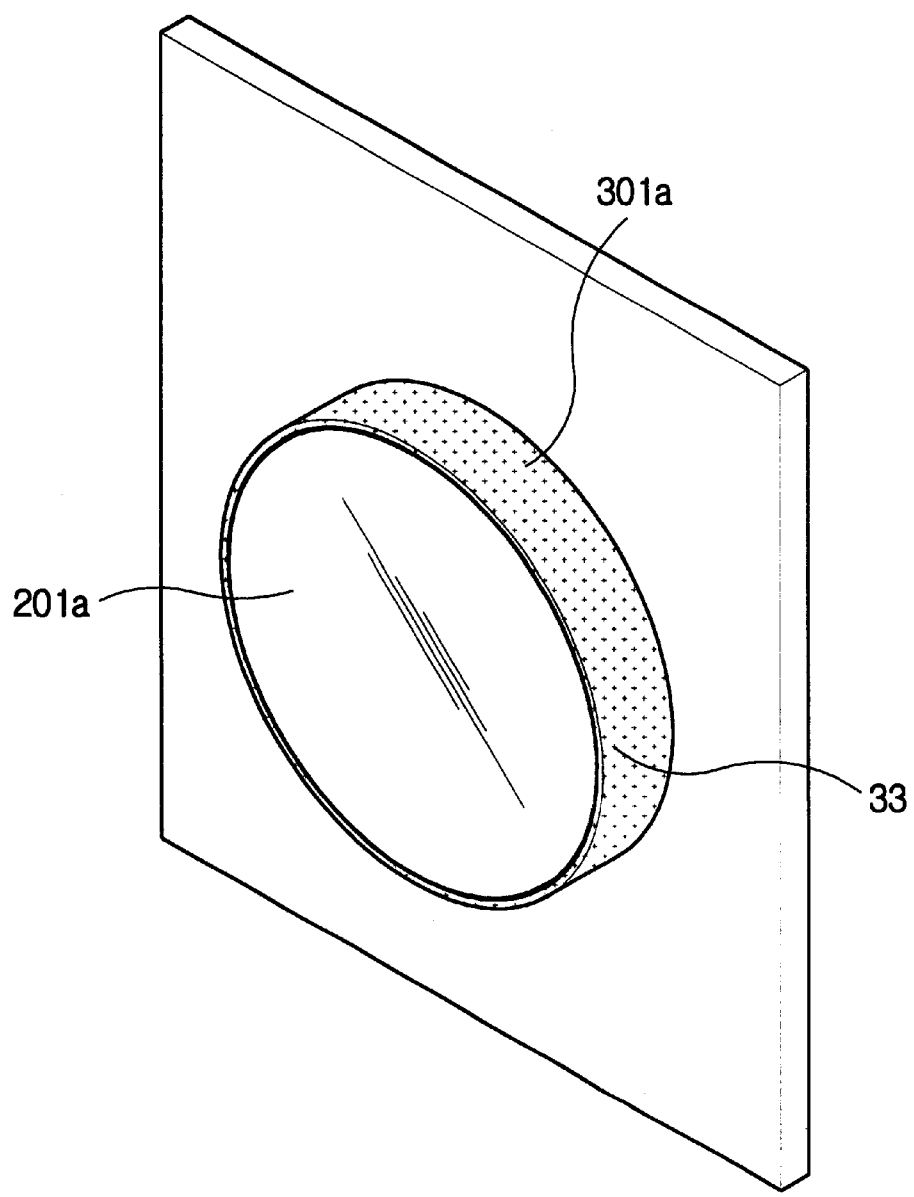

FIGS. 2A, 2B, and 2C are front views showing a microwave oven provided on an external surface of a door of the microwave oven with saucer holders according to embodiments of the present invention. FIG. 3 is a sectional view taken along a line A—A of FIG. 2A. FIG. 4A is a perspective view showing a projecting part of a saucer holder provided on the external surface of the microwave oven. FIGS. 4B and 4C are perspective views showing projecting parts of saucer holders.

As shown in FIG. 2A, the microwave oven includes a door 200 on a left side of its front wall and a control panel 203 on a right side of the front wall. The control panel 203 is used to input a desired cooking time and a desired cooked state of food to be cooked in the microwave oven. The door 200 is provided on its external surface with five saucer holders 201. Of the five saucer holders 201, three saucer holders 201 are arranged on an upper portion of the door 200, while two saucer holders 201 are arranged on a lower portion of the door 200. A knob-type handle 202a is provided on the door 200 in such a way as to be aligned with the two saucer holders 201 arranged on the lower portion of the door 200. Each of the saucer holders 201 includes a projecting part and a circular groove 201b. The projecting part of each holder 201 includes a disc 201a and a cylindrical sidewall 301a (see FIG. 3). The disc 201a is positioned in parallel to the external surface of the door 200, and has a predetermined diameter. The sidewall 301a surrounds the disc 201a and perpendicularly extends from an edge of the disc 201a. Further, the circular groove 201b is formed around an outer circumference of the projecting part to surround the projecting part, and has a predetermined depth and width. Here, a saucer engages with the projecting part of the saucer holder 201.

Preferably, the saucer holders 201 are made of a transparent material. In such a case, when the saucer is removed from the saucer holder 201, a user on an outside of the microwave oven may view the cooked state of food seated in a cooking cavity of the microwave oven through the transparent saucer holder 201. Thus, the saucer holder 201 made of a transparent material serves as a window.

In FIG. 2B, the door 200 is provided with a window 11 which is made of the transparent material. Six saucer holders 201 are provided on the window 11. A grip-type handle 202b is provided to a right side of the door 200 at a position outside the window 11. Since the saucer holders 201 are made of the transparent material, the user may view the cooked state of food in the microwave oven.

In FIG. 2C, the transparent window 11 is provided on a center portion of the door 200. Four saucer holders 201 are arranged around the transparent window 11. Again, the saucer holders 201 are preferably made of a transparent material.

FIG. 3 shows a cross-section taken along a line A—A of FIG. 2A. The sidewall 301a extends perpendicularly from the edge of the disc 201a.

Preferably, a magnet or a magnetic material is provided on or at least on a portion of one of the circular groove 201b, the cylindrical sidewall 301a, and the disc 201a of the saucer holder 201. When each saucer is provided on its outer surface with a magnet or a magnetic material, the saucer is magnetically attached to the saucer holder 201 having the magnet or the magnetic material.

FIG. 4A is an enlarged view of the projecting part of the saucer holder. Here, the saucer holder 201 is used with a saucer having an elastic rubber or silicone layer. That is, the saucer with such a rubber or silicone layer removably engages with the projecting part of the saucer holder 201 through a frictional engagement.

In FIG. 4B, a helical thread 401 is exteriorly formed on the sidewall 301a of the projecting part. Alternatively, a helical groove may be formed on the sidewall 301a in place of the helical thread 401. In this case, a helical groove or a helical thread is formed on the saucer to correspond to the helical thread or the helical groove of the saucer holder 201, such that the saucer engages with the saucer holder 201 through a screw-type engagement. Thus, the helical groove and thread of the saucer and the saucer holder 201 are designed such that the screw-type engagement of the saucer with the saucer holder 201 is accomplished by rotating the saucer over the saucer holder 201 at a small angle.

In FIG. 4C, the saucer is magnetically attached to the saucer holder 201. The saucer holder 201 is provided at its sidewall 301a with a magnet layer 33. Alternatively, a magnetic material layer may be used in place of the magnet layer 33. Here, the saucer used with the saucer holder 201 is provided with a magnet layer or a magnetic material layer to correspond the magnetic material layer or the magnet layer 33 of the saucer holder 201.

The feature of the structure of the saucer holder 201 and the saucer engaging with each other will be described in more detail with reference to FIGS. 7A, 7B, and 7C. The saucer will be described below.

FIGS. 5A, 5B, 5C, 5D, and 5E are perspective views of the saucers described above.

Figure 5A:
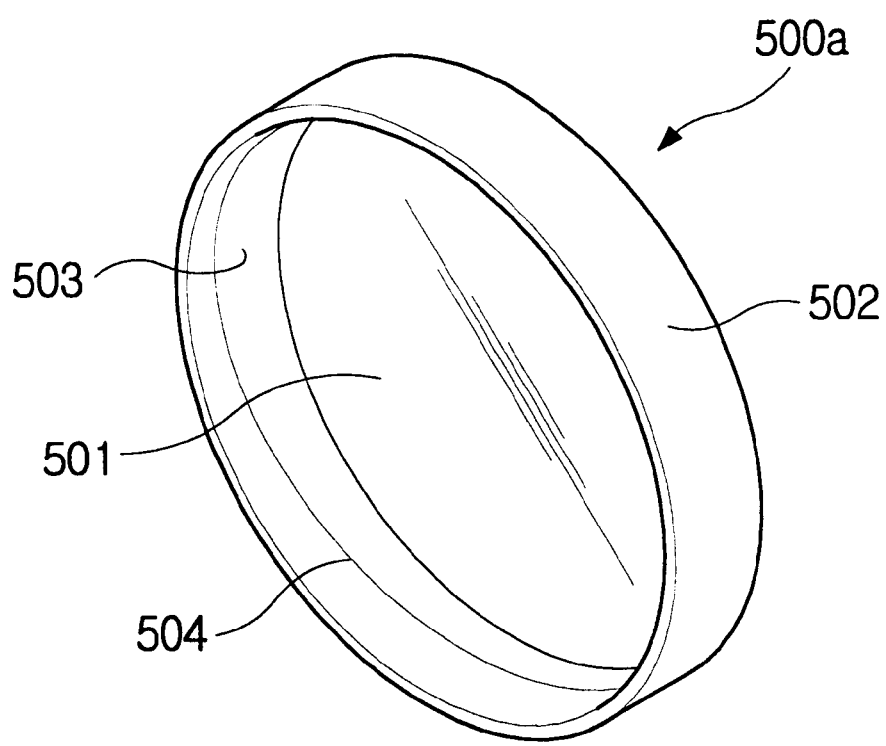
FIG. 5A is a perspective view showing a saucer with a helical groove being formed on the saucer.

As shown in FIG. 5A, a saucer 500a includes a seat 501 and a cylindrical sidewall 502. A cup is seated on the seat 501 having a disc shape. The sidewall 502 surrounds the seat 501 and perpendicularly extends from an edge of the seat 501 to a predetermined height. A helical groove 504 is formed on an inner surface 503 of the sidewall 502. A helical thread may be formed on the sidewall 502 in place of the helical groove 504. Thus, the saucer holder 201 for the saucer 500a is provided with a helical thread or a helical groove to correspond to the saucer 500a such that the saucer 500a engages with the saucer holder 201 through the screw-type engagement. In such a case, the helical groove and thread are designed such that the screw-type engagement of the saucer 500a with the saucer holder 201 is accomplished by rotating the saucer 500a over the saucer holder 201 at a small angle.

Figure 5B:
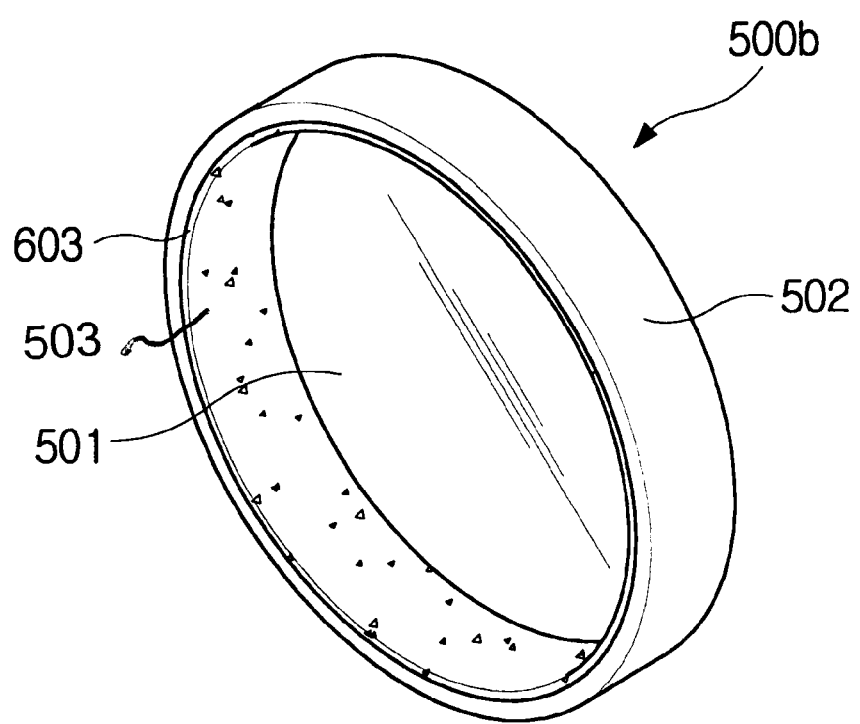
FIG. 5B is a perspective view of a saucer provided with a silicone layer.

In FIG. 5B, a saucer 500b is provided on an inner surface 503 of its sidewall 502 with a silicone layer 603. The saucer 500b elastically engages with the saucer holder 201 by an elastic force of the silicone layer 603 of the sidewall 502. An elastic material layer such as a rubber may be used instead of the silicone layer 603.

Figure 5C:
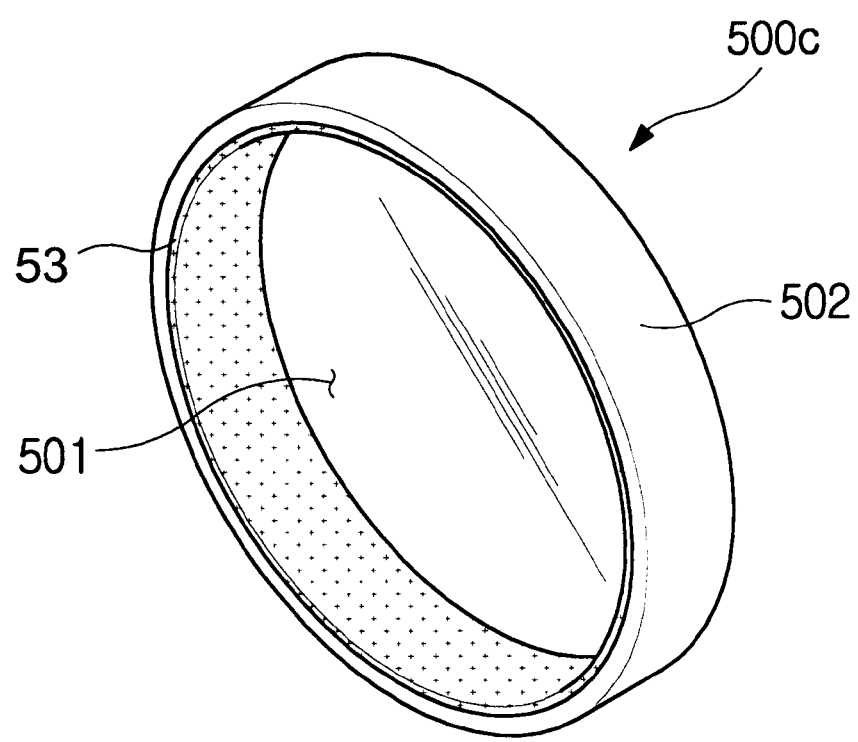
FIGS. 5C, 5D and 5E are perspective views of saucers provided with magnet layers.
Figure 5D:
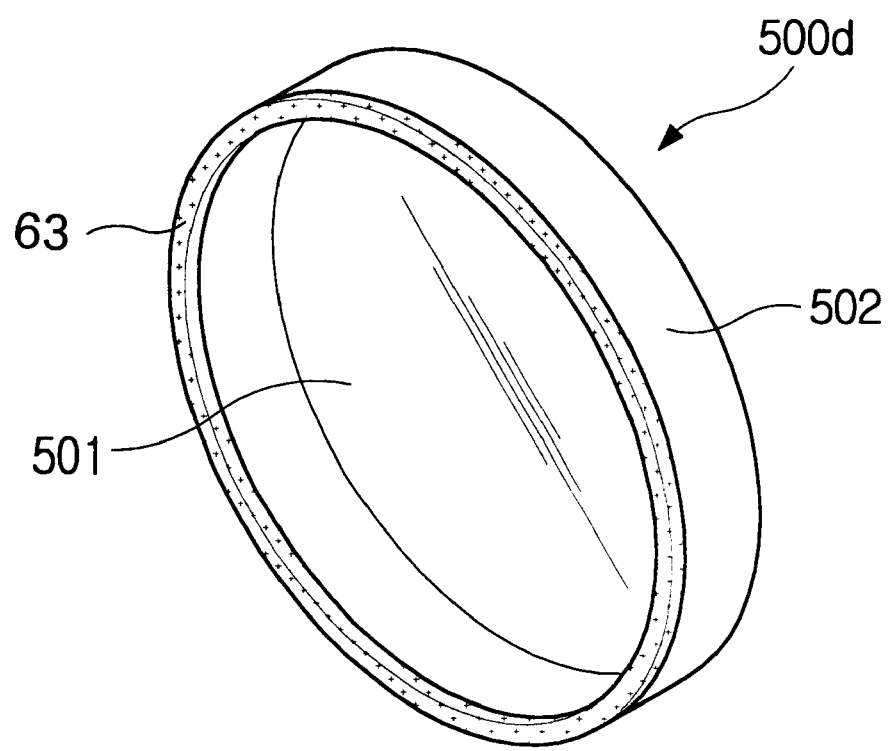
Figure 5E:
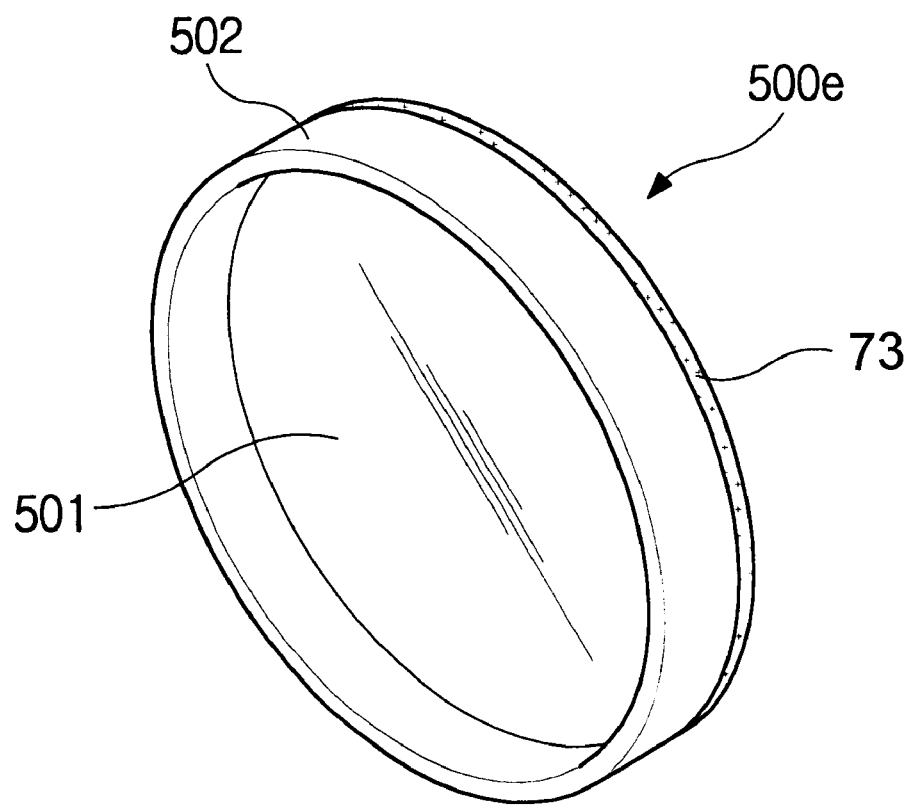

As shown in FIGS. 5C, 5D and 5E, a magnetic material layer or a magnet layer is provided at a predetermined portion of a saucer 500c, 500d, or 500e. In FIG. 5C, a magnetic layer 53 is provided on the inner surface of the sidewall 502. In FIG. 5D, a magnetic layer 63 having a ring shape is provided along the edge of the sidewall 502. In FIG. 5E, a thin magnetic layer 73 is provided on the outer surface of the seat 501. The saucers 500c, 500d, or 500e are magnetically attached to the saucer holder 201 provided with a magnetic material layer or a magnet layer. The two saucers 500d and 500e of FIGS. 5D and 5E are magnetically seated on the saucer holders 201. In addition, when the external surface of a body of the microwave oven is made of a magnetically attached material such as a steel sheet, the saucers 500d and 500e may be magnetically attached to the external surface of the microwave oven.

Further, the saucers 500a, 500b, 500c, 500d, and 500e are made of a transparent material such as glass and plastic. In such a case, the saucer does not obstruct a user's field of vision, such that the user outside the microwave oven may confirm the cooked state of food inside the cooking cavity of the microwave oven.

Figure 6:
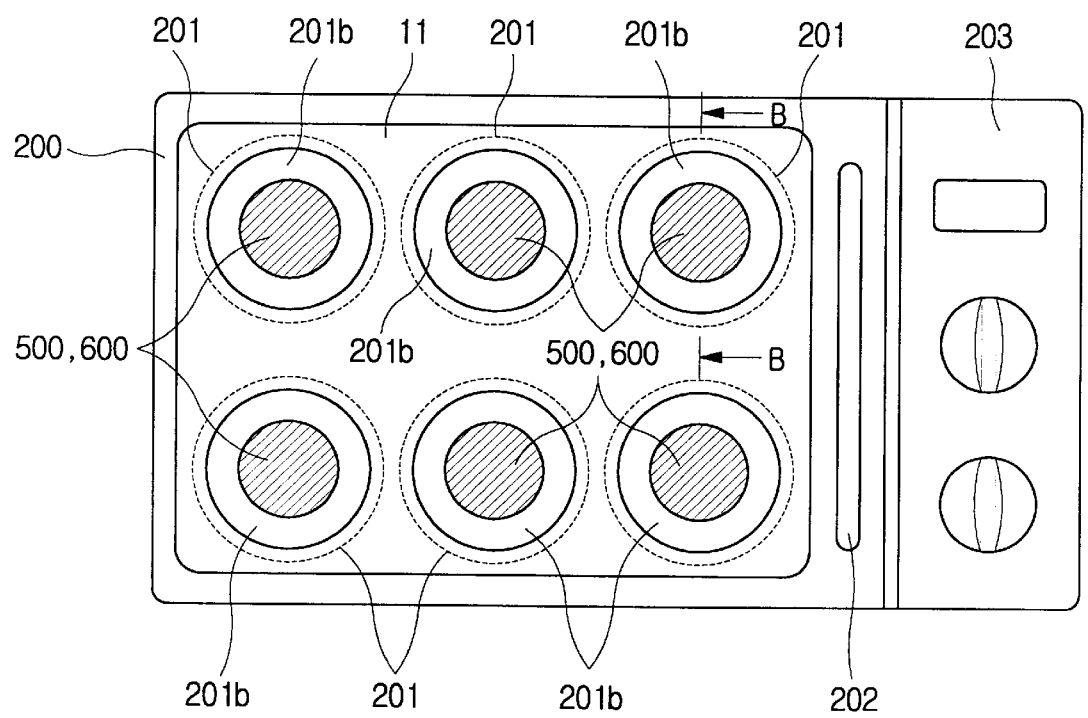
FIG. 6 is a front view showing the microwave oven with the saucers engaged with the saucer holders provided on the microwave oven.

FIG. 6 is a front view showing the microwave oven with the saucers engaged with the saucer holders provided on the microwave oven.

Figure 7A:
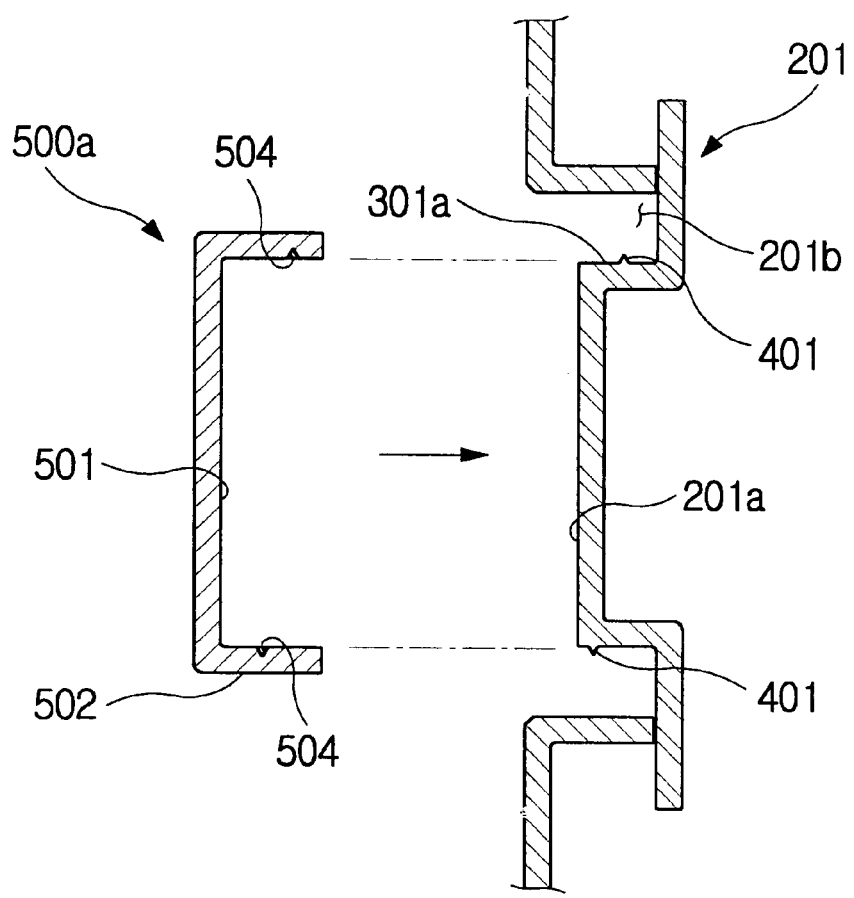
FIGS. 7A, 7B and 7C are sectional views of the saucer holders engaging with the saucers shown in FIGS. 5A, 5B, and 5C, respectively.
Figure 7B:
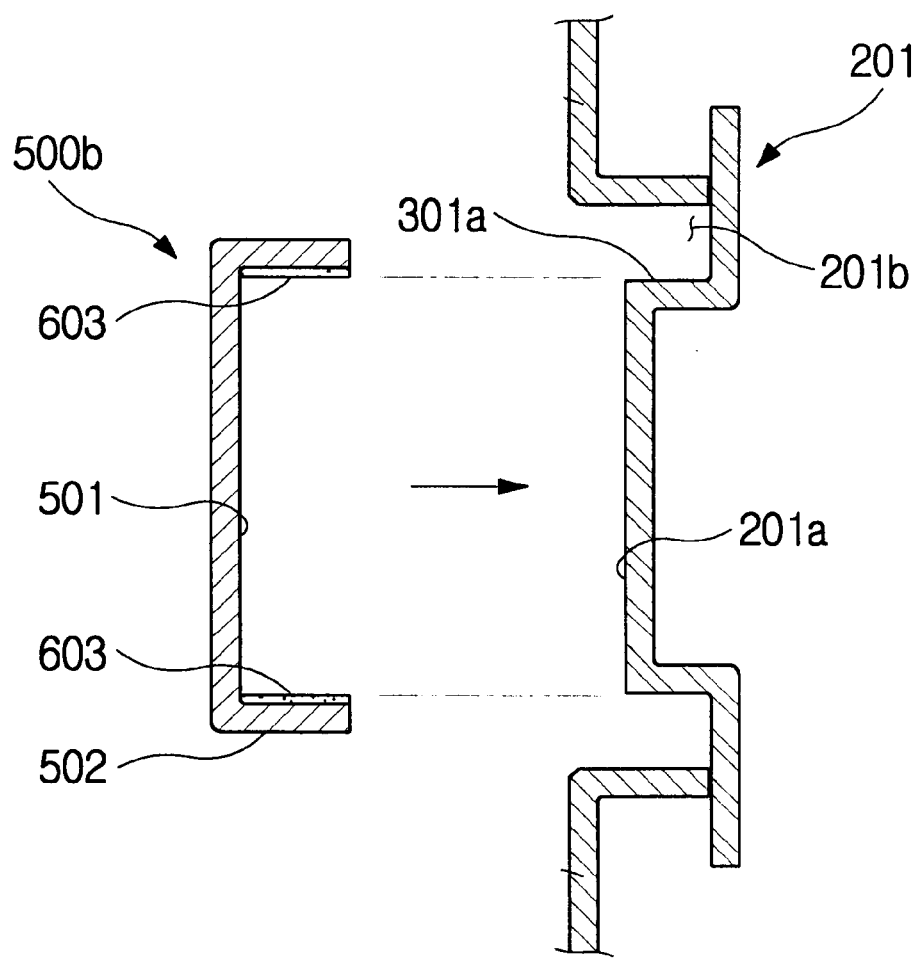
Figure 7C:
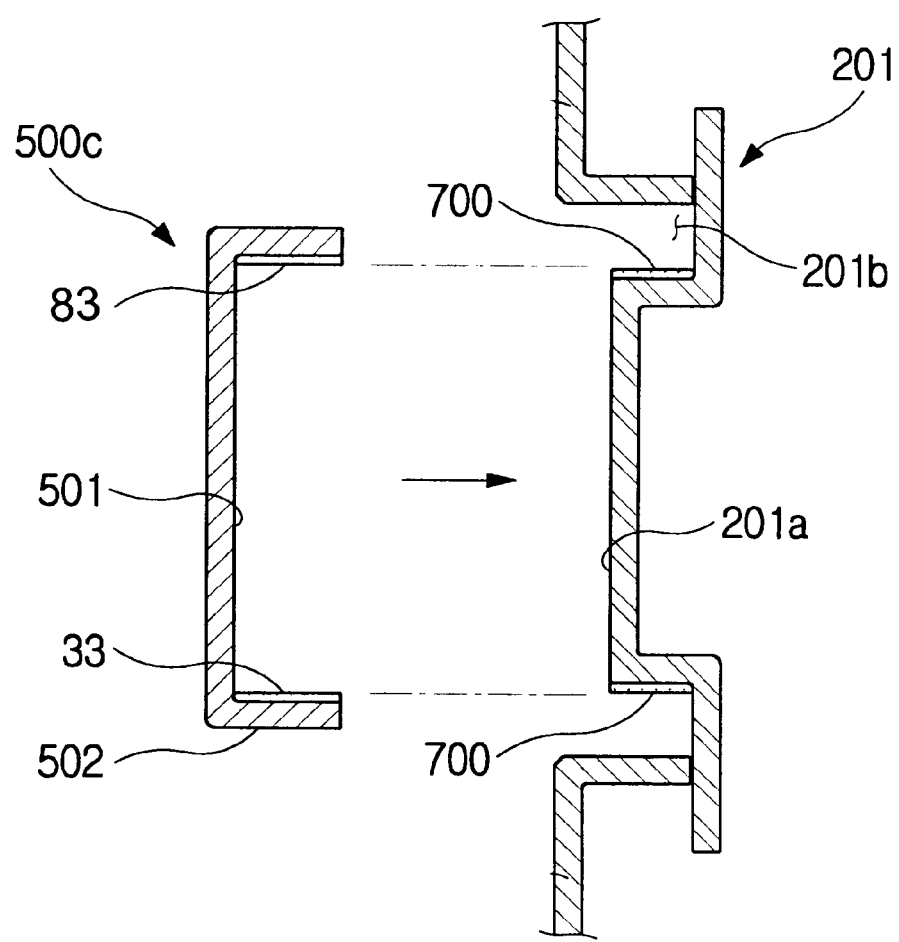

FIGS. 7A, 7B and 7C are sectional views of the saucer holders engaging with the saucers shown in FIGS. 5A, 5B, and 5C, respectively, and show the structural characteristics of the saucer holders and saucers engaging with each other.

In FIG. 7A, a helical thread 401 is exteriorly formed on the sidewall 301a of the saucer holder 201, and a helical groove 504 is interiorly formed on the sidewall 502 of the saucer 500a such that the saucer 500a engages with the saucer holder 201 through the screw-type engagement.

In FIG. 7B, a silicone layer 603 is interiorly formed on the sidewall 502 of the saucer 500b to engage with the saucer holder 201 through a frictional engagement. In this case, it is unnecessary for the saucer holder 201 to have a particular structure to engage with the saucer, which is different from the screw-type engagement or a magnetic attachment.

In FIG. 7C, the saucer holder 201 is provided on the outer surface of its sidewall with a magnet layer 700, while the saucer 500c is provided on the inner surface of its sidewall with a magnetic material layer 83 such that the saucer 500c is magnetically attached to the saucer holder 201.

As described above, the present invention provides a microwave oven having a saucer holder mounted on its external surface without affecting a viewing function of a window. The microwave also includes a saucer used with the microwave oven and removably engaged with the saucer holder. Thus, the microwave oven has a function of offering a saucer to a user in addition to its original function of cooking food, which therefore allows a user to easily carry a heated cup after a cooking process. The saucer is also versatile in that it may be used as a saucer to hold a cup.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A microwave oven, comprising:
   a door to selectively open a cooking cavity of the microwave oven; and
   a saucer holder provided at a predetermined position of an external surface of the door of the oven to removably hold a saucer on said holder.

2. The microwave oven according to claim 1, wherein a plurality of saucer holders are provided on the external surface of the door of the microwave oven.

3. The microwave oven according to claim 1, wherein said saucer is provided on the external surface of the door.

4. The microwave oven according to claim 3, wherein said door comprises:
   a window to view an interior of the oven to confirm a state of food cooked in the cooking cavity with at least one other saucer holder being provided on the window.

5. The microwave oven according to claim 3, wherein said door comprises:
   a transparent window to view an interior of the oven to confirm a state of food cooked in the cooking cavity separately from the saucer holder.

6. The microwave oven according to claim 1, wherein said saucer holder comprises:
   a projecting part including:
      a disc arranged in parallel to the external surface of the microwave oven and having a predetermined diameter;
      a wall to surround the disc while perpendicularly extending from an edge of the disc; and
      a circular groove formed around an outer circumference of the projecting part to surround said projecting part and having a predetermined depth and width.

7. The microwave oven according to claim 3, wherein said saucer holder comprises:
   a projecting part including:
      a disc having a surface arranged in parallel to the external surface of the microwave oven and having a predetermined diameter;
      a wall to surround the disc while perpendicularly extending from an edge of the disc; and
      circular groove formed around an outer circumference of the projecting part to surround said projecting part and having a predetermined depth and width.

8. The microwave oven according to claim 7, wherein said saucer holder is made of a transparent material to view an interior of the microwave oven.

9. The microwave oven according to claim 6 or 7, further comprising:
   a helical thread or a helical groove exteriorly formed on the wall of the projecting part of the saucer holder so that the saucer engages with the saucer holder when rotating the saucer over the saucer holder at a predetermined angle.

10. The microwave oven according to claim 6 or 7, further comprising:
    a magnet layer or a magnetic material layer provided at a predetermined portion of the saucer holder.

11. The microwave oven according to claim 10, wherein said magnet layer or magnetic material layer is exteriorly provided along the wall of the projecting part of the saucer holder.

12. A microwave oven, comprising:
    a door to selectively open a cooking cavity of the microwave oven;
    a saucer holder provided at a predetermined position on an external surface of the door of the microwave oven; and
    a saucer to removably engage with the saucer holder.

13. The microwave oven according to claim 12, wherein a plurality of saucer holders are provided on the external surface of the door of the microwave oven.

14. The microwave oven according to claim 12, wherein said saucer is provided on the external surface of the door.

15. The microwave oven according to claim 12, wherein the saucer holder is made of a transparent material and serves as a window to view an interior of the microwave oven.

16. The microwave oven according to claim 12, wherein the saucer holder comprises:
    a projecting part including:
       a disc having a surface arranged in parallel to the external surface of the microwave oven and having a predetermined diameter;
       a wall to surround the disc while perpendicularly extending from an edge of the disc; and
       a circular groove formed around an outer circumference of the projecting part to surround said projecting part and having a predetermined depth and width.

17. The microwave oven according to claim 16, wherein the saucer comprises:
   a cup seated part having a disc shape; and
   a cylindrical sidewall to surround a seat of the cup seating part and perpendicularly extend from an edge of the seat to a predetermined height.

18. The microwave oven according to claim 17, wherein a magnet layer or a magnetic material layer of the saucer holder is magnetically attached to a magnet layer or a magnetic material layer of the saucer.

19. The microwave oven according to claim 17, wherein a helical thread or a helical groove is exteriorly formed on the wall of a projecting part of the saucer holder, and a helical thread or a helical groove is interiorly formed on the wall of the saucer, so that the saucer engages with the saucer holder through a screw-type engagement.

20. The microwave oven according to claim 12, wherein the saucer comprises an elastic rubber or silicone layer, and the saucer holder comprises a projecting part.

21. The microwave oven according to claim 20, wherein the saucer having the elastic rubber or silicone layer is removably engaged with the projecting part of the saucer holder through a frictional engagement.

* * * * *